United States Patent

[11] 3,573,757

[72] Inventor Robert T. Adams
Short Hills, N.J.
[21] Appl. No. 773,035
[22] Filed Nov. 4, 1968
[45] Patented Apr. 6, 1971
[73] Assignee Energy Conversion Devices, Inc.
Troy, Mich.

[54] MEMORY MATRIX HAVING SERIALLY CONNECTED THRESHOLD AND MEMORY SWITCH DEVICES AT EACH CROSS-OVER POINT

4 Claims, 10 Drawing Figs.

[52] U.S. Cl. .......... 340/173, 307/317, 317/235
[51] Int. Cl. .......... G11c 11/36, H03k 19/12
[50] Field of Search .......... 340/173 (NR), 166; 307/310, 319, 322, 323, 298; 317/235 (22)

[56] References Cited

UNITED STATES PATENTS

| | | | |
|---|---|---|---|
| 3,011,155 | 11/1961 | Dunlap | 340/173 |
| 3,271,591 | 9/1966 | Ovshinsky | 340/173X |
| 3,445,816 | 5/1969 | Polasak | 340/166 |
| 3,445,823 | 5/1969 | Petersen | 340/173 |
| 3,467,945 | 9/1969 | Myers | 340/166 |

*Primary Examiner*—Terrell W. Fears
*Attorney*—Wallenstein, Spangenberg, Hattis & Strampel ABSTRACT: A binary memory circuit used in a memory matrix array of the crossgrid X-Y conductor type. The memory matrix of X and Y axes conductors forming rows and columns of conductors to be addressed, first and second series connected switch devices coupled between each active cross-over point of the X and Y conductors, each first switch device being a threshold switch device which has a relatively high resistance condition when the voltage applied thereto is below a first voltage threshold level, and is switched to a relatively low resistance condition when the voltage applied thereto reaches said first voltage threshold level, which low resistance condition remains until the current therethrough drops below a given holding value, and each second switch device being a memory switch device which is triggered into a relatively low resistance condition when the value of the voltage applied thereto EXCEEDS a second voltage threshold level and which condition remains in such low resistance condition independently of the presence of absence of an applied voltage until reset to a high impedance condition with the feeding of a reset current pulse therethrough.

Inventor
Robert T. Adams
By: Wallenstein, Spangenberg, Hattis & Strampel Attys

Inventor
Robert T. Adams
By: Wallenstein, Spangenberg, Hattis & Strampel Attys.

Inventor
Robert T. Adams
By: Wallenstein, Spangenberg, Hattis & Strampel
Attys.

MEMORY MATRIX HAVING SERIALLY CONNECTED THRESHOLD AND MEMORY SWITCH DEVICES AT EACH CROSS-OVER POINT

The present invention relates to a binary memory and to memory matrices of the type which comprises a series of X and Y axes conductors forming rows and columns of conductors to be addressed for write (i.e. set and reset or write 1 and write 0) and readout operations. Such memory matrices store binary coded information in computers and the like.

A majority of computers use coincident current magnetic memory matrices where a magnetic core or other magnetic element is located at each crossover point. Such memory matrices are popular because of their high write and readout speeds and random-access characteristics.

The memory matrix of the present invention provides a coincident voltage memory matrix which is faster, less expensive and much easier to use than magnetic and other memory matrices. Unlike the magnetic core memories, the present invention can be read nondestructively (without erasing the record and requiring a rewrite operation each time). At present, the conventional readout cycle with magnetic memories includes reading, temporary storage, and rewriting before another address can be read. The coincident voltage memory matrix of the invention requires only one step instead of three steps in the readout operation, a simpler subroutine is used to control the readout cycle than in magnetic memories, and the stored data is not exposed to possible error or loss during readout as in the case of magnetic memories. These readout advantages can be very important where stored information will be held during repeated readouts (stored tables of data or the steps of a computer subroutine, for example).

Apart from advantages of the speed and nondestructive readout, the coincident voltage memory of the invention is well suited to driving from transistors because of the modest drive voltage and current levels involved, and readout can be accomplished without expensive multistage sensitive read amplifiers because the readout signal can be at a DC voltage level directly compatible with DC logic circuits, requiring no further amplification.

The coincident voltage memory matrix of the invention utilizes at each crossover point thereof a binary memory circuit which includes a threshold switch device and a memory switch device connected in series. These devices are most advantageously films or layers of semiconductor material applied by vacuum deposition, sputtering or screening on any suitable base of insulation material or directly upon the X and Y conductors of the matrix which may be similarly deposited by screening or otherwise on a base of insulation material. Threshold and memory switch devices of this kind are disclosed and claimed in U.S. Pat. No. 3,271,591, granted on Sept. 6, 1966 to S. R. Ovshinsky. In this patent, these switch devices are referred to respectively as "Mechanism" and "Hi-Lo" devices. Thus, although these switch devices may, in accordance with a broad aspect of the invention, be discrete devices, in the most advantageous form of the invention they constitute simple semiconductor film deposits on any suitable substrate so that they can be made by inexpensive, mass production, batch fabrication techniques and so a matrix with a given number of storage points will occupy a minimum of space.

The threshold switch device at each active crossover point of the matrix of the invention is a two-terminal device which switches from a normally high resistance to low resistance condition when the applied voltage exceeds some threshold value, and reverts to the high resistance state when the current flow therethrough falls below some minimum value. Although of little practical value a neon lamp and four or five-layer diodes are theoretically useful as switch devices in the voltage memory matrix being described. However, these devices are discrete devices or they require special substrates, as in the case of integrated circuit type semiconductor diodes, so that they cannot be fabricated by film deposition on almost any base like the film-type semiconductor threshold switch devices disclosed in said U.S. Pat. No. 3,271,591. Furthermore, unlike neon lamps and said four and five-layered diodes, these film threshold switch devices can be fabricated with a wide selection of threshold levels of modest values (e.g., 5—30 volts) merely by controlling the thickness of the films.

The memory switch device at each crossover point of the matrix is a two-terminal bistable device which is triggered into a low resistance condition when a voltage above a given threshold value is applied thereto and which then remains indefinitely in its low resistance condition even when the applied voltage is removed, until reset to a high resistance condition as by feeding a relatively large reset current pulse therethrough at a voltage below said memory threshold value. As in the case of the threshold switch device, the memory switch device used in the coincident voltage matrix of the invention may be of the type disclosed in said U.S. Pat. No. 3,271,591. The film threshold and memory switch devices will be described in more detail later on in the specification. While for purposes of illustration, reference is made to switch devices of the type disclosed in U.S. Pat. No. 3,271,591, other switch devices having threshold and memory switching characteristics, respectively, similar to those of devices of the patent may be utilized in the matrix of this invention.

When a threshold switch device is connected in series with a memory switch device, the resulting combination, if the resistance of the two devices are comparable, will require a relatively high voltage (i.e., a voltage at least twice the lower of the threshold values of the devices involved) to switch both the threshold and memory switch device from high resistance to low resistance conditions. On the other hand, if the resistances of the two devices are substantially different, the two devices can be driven to their low resistance conditions by a voltage much less than twice the sum of the lowest of the threshold voltage values of the two devices. Such a voltage will first switch one of the devices into its low resistance condition and additionally, if the applied voltage is equal to or greater than the threshold value of the other device, will also switch the other device to its low resistance condition. In the case where the impedances of the two devices are materially different, for the sake of reliability, it has been determined by persons other than the present inventor that the threshold value of the memory switch devices should be greater than that of the threshold switch devices. A readout operation to determine whether a selected memory switch device is in a low or high resistance condition involves the feeding of a voltage across the associated X and Y conductors which is insufficient to trigger the memory switch device involved when in a high resistance condition to a low resistance condition but is sufficient to drive a threshold switch device to its low resistance condition when it is associated with a memory switch device already in its low resistance condition.

The above and other advantages and features of the invention will become more apparent upon making reference to the specification to follow, the claims and the drawings wherein:

Figures 1, 2:
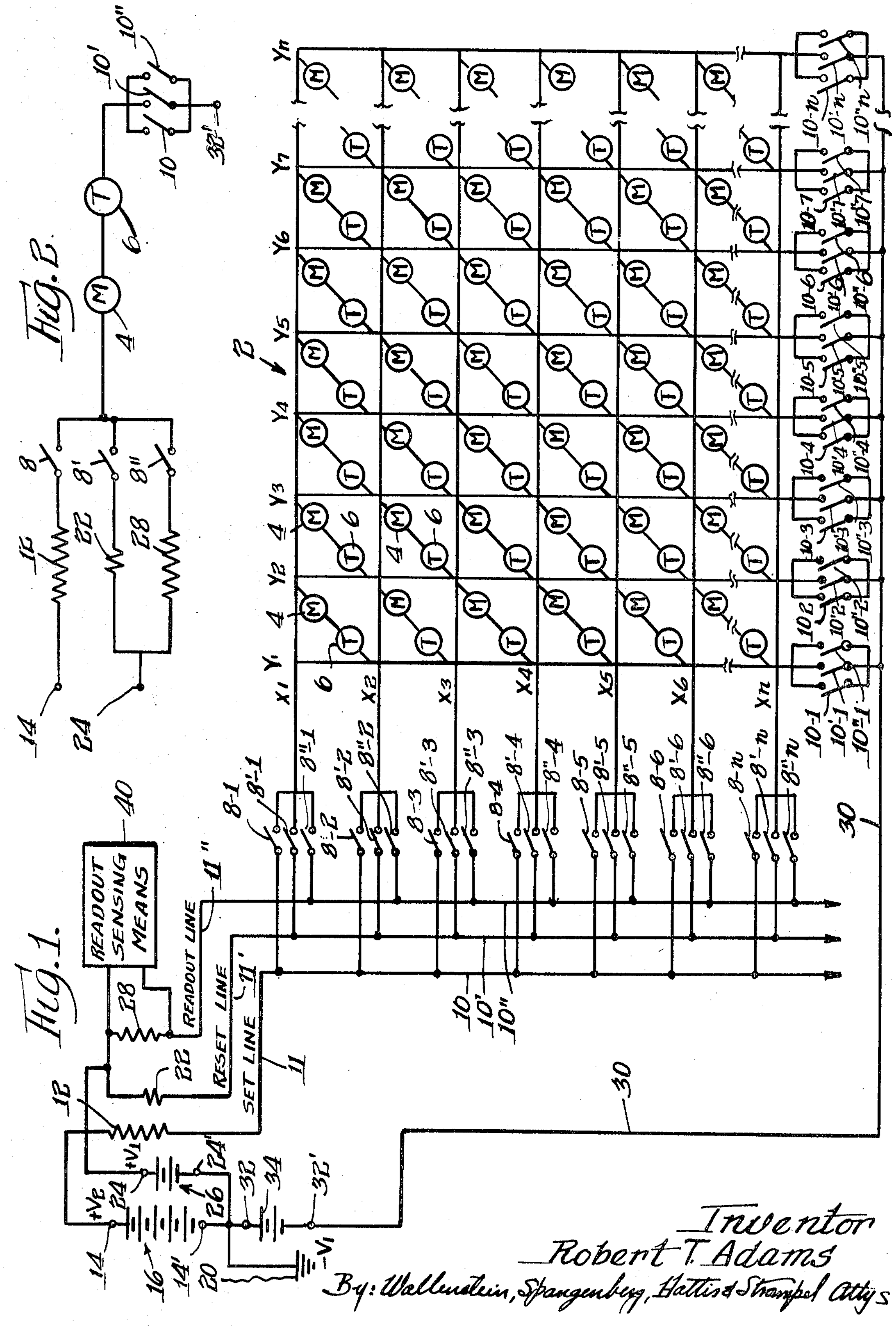
FIG. 1 is a circuit diagram of the voltage memory matrix of the invention and exemplary circuits for writing information into and reading information from the matrix.
FIG. 2 is a simplified diagram of the complete circuit associated with any active crossover point of the matrix.

Referring now more particularly to FIG. 1, there is shown a voltage memory matrix generally indicated by reference numeral 2 which comprises a series of mutually perpendicular X and Y conductors respectively identified as conductors X1, X2, ...Xn and Y1, Y2...Yn. The X and Y conductors cross one another when viewed in a two dimensional drawing, but the conductors do not make physical contact. Rather, each X and Y conductor is interconnected at or near their crossover point by a series circuit of a memory switch device 4 and a threshold switch device 6. As in the case of most memory matrices, information is stored at each crossover point preferably in the form of a binary 1 or 0 digit indicated by the state or condition of a memory element. Thus, in magnetic core matrices, the particular magnetic state of a core device determines whether a binary 1 or 0 is stored at the particular crossover point of the matrix. In the present invention, the binary digit information at each crossover point is determined by whether the memory switch device 4 thereat is in a low resistance condition, which will arbitrarily be considered a 1 binary state, or a high resistance condition, which will arbitrarily be considered a 0 binary state. The threshold switch device 6 isolates each crossover point from other crossover points.

A switching system is provided (the details of which may vary widely) for connecting one or more voltage sources between a selected X and a selected Y conductor to perform a setting, resetting or readout operation at the crossover point. As illustrated, each X conductor is connected to one of the ends of a set of three parallel switches 8, 8′ and 8″ (which switches are identified by additional numerals corresponding to the number assigned to the X conductor involved), the other ends of which are respectively connected to set, reset and readout lines 11, 11′ and 11″. The set line is connected through resistor 12 to a positive terminal 14 of a source of DC voltage which produces an output of V2 volts. The negative terminal 14′ of the source of DC voltage is grounded at 20 so the voltage of terminal 14 is +V2 volts. The reset line 11′ is coupled through a relatively small resistor 22 to the positive terminal 24 of a source of DC voltage 26 whose negative terminal 24′ is grounded at 20. The positive terminal 24 produces a voltage of +V1 volts above ground. The readout line 11″ is connected through resistor 28 to the positive terminal 24.

Each Y conductor is connected to one of the ends of a set of parallel switches 10, 10′ and 10″ which are also identified by another number corresponding to the number of the X or Y conductor involved. The other ends of these switches are connected to a common line 30 leading to the negative terminal 32′ of a source 34 of DC voltage whose positive terminal 32 is grounded at 20. The negative terminal 32′ is thus at −V1 volts with respect to ground.

The switches 8, 8′, 8″, 10, 10′ and 10″ can be high speed electronic switches or contacts. Manifestly, high speed electronic switches are preferred. Switch control means (not shown) are provided to close the appropriate pair of switches to connect the proper positive and negative voltage sources respectively to the selected X and Y conductors.

As previously indicated, each threshold switch device 6 and memory switch device 4 is a threshold device in that, when it is in a high resistance condition, a voltage which equals or exceeds a given threshold value must be applied thereacross to drive or trigger the same into its low resistance condition. On the assumption that the resistance of these devices in their high resistance conditions are of comparable or substantially equal values, to write a binary digit 1 into the memory switch device at any crossover point, it is necessary to apply a voltage across the selected X and Y conductor which equals or exceeds twice the sum of the lowest threshold value of the series connected devices 4 and 6. Thus, for example, if the memory switch device 4 has a threshold value of 20 volts and the threshold device switch 6 has a threshold value of 15 volts, the voltage applied by closure of any selected pair of switches 8—10 should equal or preferably exceed 30 volts, as illustrated by the 35 volt set voltage level shown in FIG. 3. This means that the sum of the outputs of DC voltage sources 16 and 34 connected between the terminals 14 and 32′ should also exceed 30 volts since the values of the resistor 12 (as well as resistors 22 and 28) are infinitesimal relative to the resistance of the switch devices 4 and 6 in their high resistance conditions. If, on the other hand, the resistance values of the threshold and memory switch devices are substantially different, the applied voltage necessary to write a binary digit 1 at any crossover point must be a value depending upon the relative values of these resistances, which value may be considerably less than the sum of the lowest of the threshold values of the devices 4 and 6. In no event, however, must a voltage be applied which reaches or exceeds the sum of the set voltages of three crossover points since this could simultaneously set any one of a number of three series connected crossover points in parallel with the selected crossover point.

Assuming once again that the resistance values of the threshold and memory switch devices in their high resistance conditions are substantially equal, to reset a memory switch device at a crossover point (i.e. to change it from the low resistance condition to its high resistance condition) the voltage applied between the reset line 11′ and the common line 30 should exceed the threshold value of the selected threshold switch device 6, since it is assumed that the resistance value of any threshold switch device 6 in its normally high resistance condition is many hundred or thousands of times greater than the resistance of the low resistance condition of any memory switch device. Also, the applied voltage must be below the threshold value of the memory switch device to be reset. The application of such a voltage between the reset line 11′ and the common line 30 will drive the threshold switch device 6 into its low resistance condition. Then, if the source resistance of the reset circuit is sufficiently low that a reset current at or above level L1 (FIG. 4) flows, the memory switch device involved will be reset to its high resistance condition. Accordingly, the resistor 22 connected in series with the reset line 11′ is made sufficiently small that the desired reset current will flow through the selected memory switch device during a resetting operation. The resistor 12 in series with the set line 11 and the resistor 28 in series with the readout line 11″ are current-limiting resistors which limit the value of the current flowing through the memory switch device during a setting or readout operation to a value below the reset current level L1. During a readout operation, a voltage is applied between the readout line 11″ and the common line 30 which is insufficiently high to drive a threshold switch device in its high resistance condition in series with a memory switch device in its high resistance condition to its low resistance or conducting condition. In the exemplary form of the invention shown in FIG. 3, where the threshold value of each threshold switch device 6 is assumed to be 15 volts and the threshold value of each memory switch device is assumed to be 20 volts, the readout voltage should exceed 15 volts and be less than 35 volts, preferably less than 20 volts. In the example illustrated in FIG. 3, both the readout voltage and the reset voltage are selected to be midway between 15 and 20 volts.

From the circuit shown in FIG. 1, it is apparent that the sum of the outputs of the DC voltage sources 26 and 34, which is 2V1, will be approximately 17.5 volts. Since the sum of the output of voltage sources 16 and 34 for a setting operation is assumed to be 35 volts, this makes the output of voltage source 16 about 26.25 volts in the exemplary circuit being described.

Figures 3, 4, 5, 6, 7:
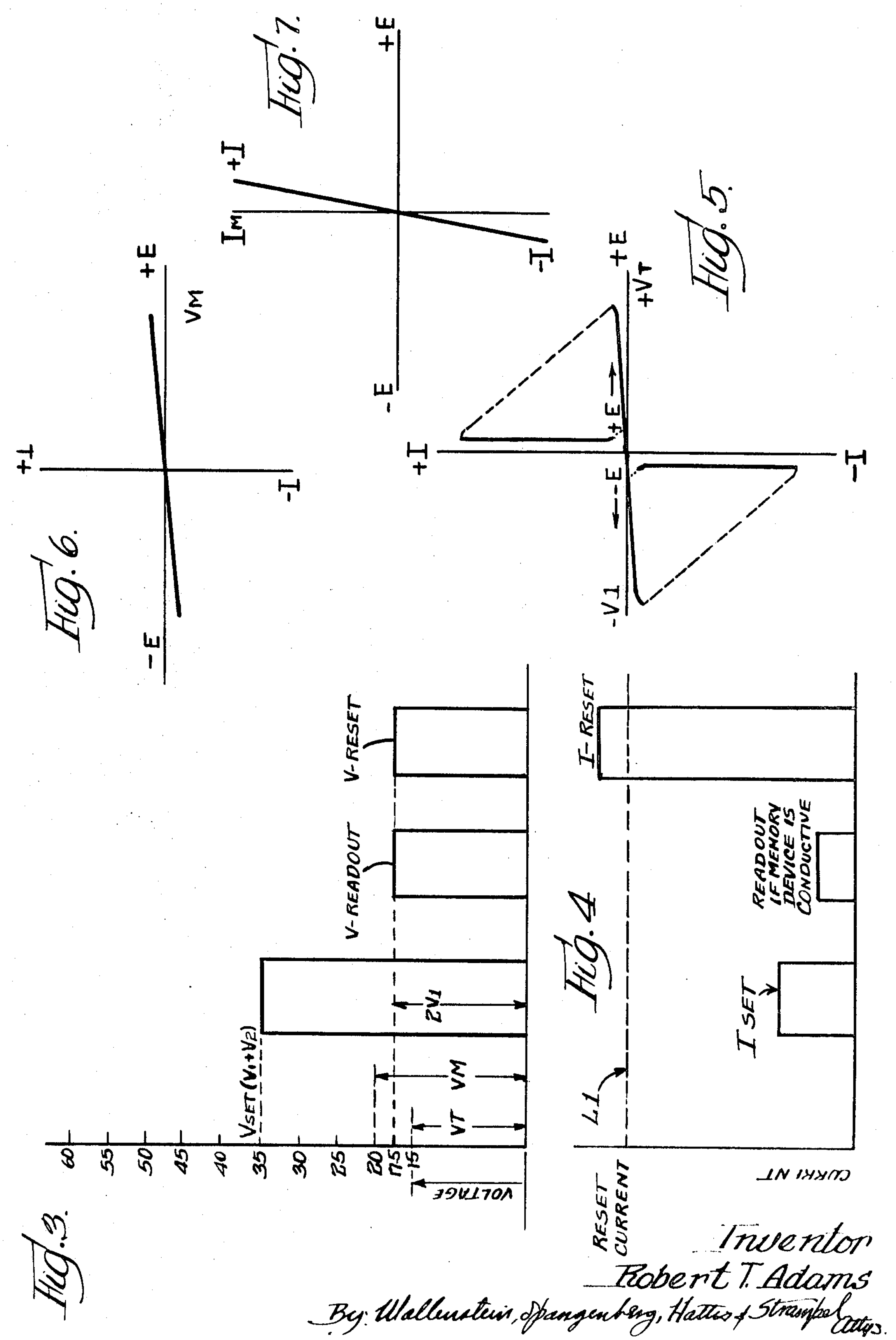
FIG. 3 illustrates the voltages which are applied to a selected crossover point of the matrix for setting the same (i.e. storing a 1 binary digit at the crossover point), for resetting the particular crossover point of the matrix (i.e. storing a 0 binary digit at the crossover point), and reading out the binary digit stored in a particular crossover point of the matrix.
FIG. 4 is a diagram illustrating the different currents which flow through the selected crossover point during setting, resetting and reading of a 1 binary digit at a particular crossover point of the matrix.
FIG. 5 is a voltage-current characteristic of a threshold switch device which may be used at each crossover point of the matrix.
FIG. 6 is a voltage-current characteristic of a memory switch device which may be at each crossover point of the matrix when the device is in its high resistance condition.
FIG. 7 shows the voltage-current characteristic of a memory switch device which may be at each crossover point of the matrix when the device is in its low resistance condition.

Here again, if the resistance values of the threshold and memory switch devices in their high resistance conditions are substantially different, the voltage levels shown in FIG. 3 will not apply. For example, if the resistance value of each threshold switch device 6 in its high resistance condition is a hundred times more than that of the resistance value of the associated memory switch device 4 in its high resistance condition, it is apparent that the applied voltage required to drive both of these devices connected in series from their high resistance to their low resistance conditions need only exceed the threshold value of the memory switch device 4, namely 20 volts in the example being given because the application of 21 volts will result in a little less than 21 volts across the threshold switch device, and, when its switches to its low resistance condition, substantially the full 21 volts will then appear across the memory switch device 4. Also, in such case, for a readout operation, the readout voltage need only be less than the threshold value of the memory switch device, namely less than 20 volts.

When a binary digit 1 is stored in a particular memory switch device, the application of a readout voltage across the associated X and Y conductor which exceeds the voltage threshold level of the associated threshold switch device will result in the flow of significant current through the resistor 28 in series with the readout line 11''. On the other hand, if the selected memory switch device is in a high resistance condition, this readout voltage will not be high enough to trigger the memory switch device into its low resistance condition, so substantially no current will flow through the resistor 28. Accordingly, a readout circuit 40 is provided which senses the voltage drop across the resistor 28 to determine whether or not the selected crossover point is in a binary 1 or 0 state.

As previously indicated, while the threshold and memory switch devices in the matrix may be of substantially any type, they are preferably of a type that comprise film deposits on any suitable insulating base, since, in such case, the fabrication costs can be minimized and the storage density of the same can be maximized. Such threshold and memory switch devices may be of the type disclosed in the aforementioned U.S. Pat. No. 3,271,591. The threshold switch device disclosed in this patent includes a film or layer of semiconductor material which is a substantially disordered and generally amorphous material in both its high resistance and low resistance conditions. The material has local order and localized bonding and is made so that any tendency to alter the local order or localized bonding is minimized upon changes between high resistance and low resistance conditions. However, in some cases, crystalline semiconductor materials can be used for these films or layers. Many examples of such semiconductor materials are described in the aforesaid patent. Typical voltage current characteristics of these threshold switch devices are shown in FIG. 5.

The memory switch device which may be of the type disclosed in the aforementioned patent includes a film or layer of semiconductor material which is also a substantially disordered and generally amorphous semiconductor material which has local order and localized bonding in its high resistance condition. However, in contrast to the threshold switch device materials, the memory switch type material is made so that the local order and localized bonding thereof can be altered to establish a conducting path or paths therethrough in a quasi permanent manner. In other words, the conductivity of the material may be drastically altered to provide a conducting path or paths in the material which is frozen in. The conducting path or paths may be realtered to substantially the original conditions by means of a current pulse. FIG. 6 shows a typical voltage-current characteristic of the memory switch device in its high resistance condition and FIG. 7 shows a typical voltage-current characteristic of the memory switch device in its low resistance condition. The threshold switch devices and the memory switch devices of the aforementioned patent have symmetrical switching characteristics with respect to the polarity of the applied voltages, and, therefore, these switch devices operate in the same manner regardless of the polarity of the applied voltages. However, as expressed above other switch devices, which do not have symmetrical switching characteristics, may be utilized in the memory matrix disclosed herein.

A typical range of low resistance values for a threshold switch device of the type disclosed in the aforementioned patent is 1 to 1000 0hms and a typical range of high resistance values for such a device is 10 to 1000 megohms. A typical range of low resistance values for a memory switch device of the type disclosed in that patent is also 1 to 1000 ohms and a typical range of high resistance values for such a device is also 10 to 1000 megohms.

In the operation of both the threshold and memory switch devices the switchover between high resistance and low resistance conditions and visa versa is substantially instantaneous and occurs along a path or paths between the conductive electrodes applied to the opposite sides of the film or layer of semiconductor material involved. The semiconductor materials disclosed in the aforesaid patent are bidirectional so that the switchover occurs independently of the polarity of the applied voltage. It should be noted from an examination of FIG. 5 and FIG. 7 that, in the low resistance condition of the memory switch device, the current conduction is substantially ohmic so there is an increase in voltage drop thereacross with an increase of current flow therethrough. In some instances, however, it has been observed that current conduction of the memory switch device takes place at a substantially constant voltage drop across the device at relatively high current levels, although it is ohmic at lower current levels. In contrast to this, in the threshold switch devices, the voltage drop across the threshold switch device remains substantially constant over a wide range of current levels.

The switching of a memory switch device from a low resistance to a high resistance condition can be achieved by applying a reset current pulse at or above the aforesaid reset level L1 at a voltage below the threshold value of the device.

As previously indicated, unlike the threshold switch device which remains in its low resistance condition only so long as the current flowing therethrough is above a current holding level, the memory switch device remains indefinitely in its low resistance condition even when the current flow therethrough is terminated and the applied voltage removed therefrom.

Figure 8:
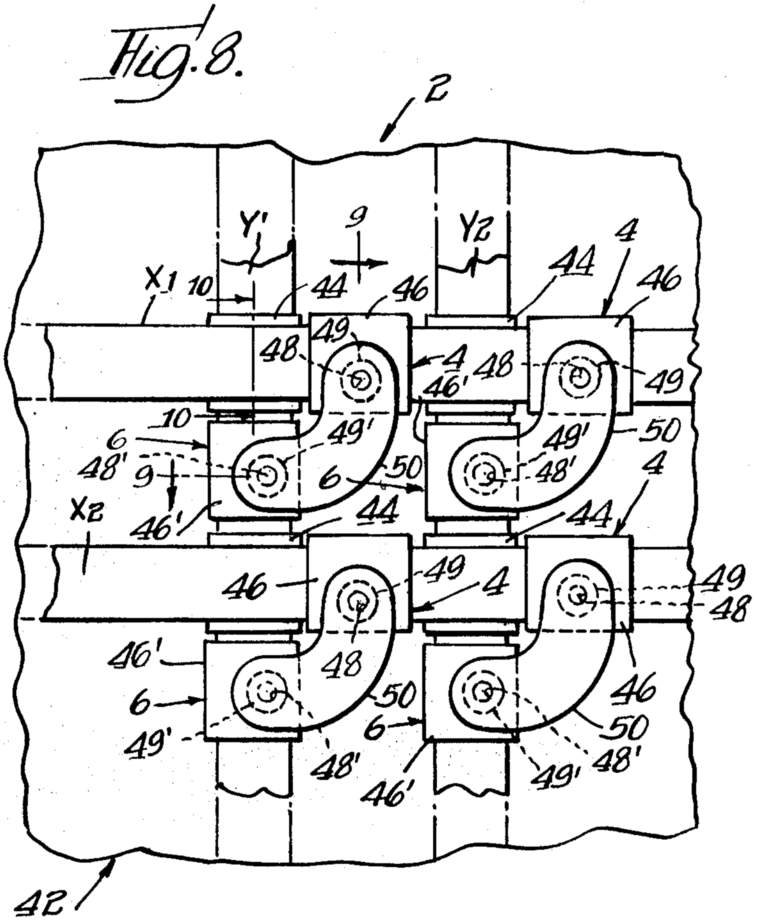
FIG. 8 is a plan view of a preferred physical form of the memory matrix of the invention.
Figure 9:
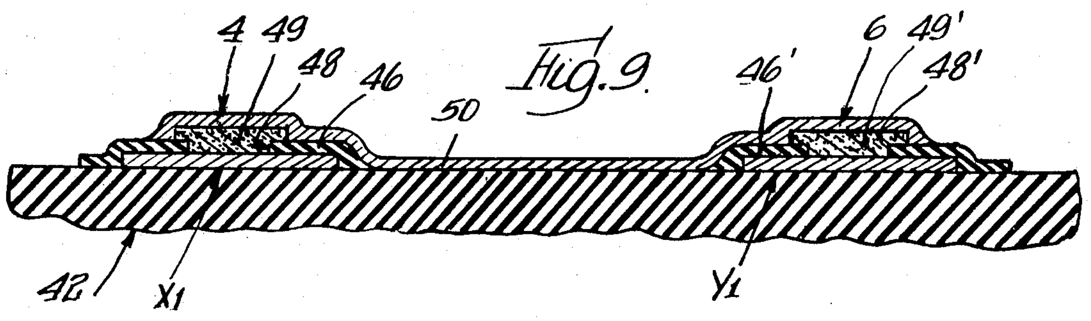
FIG. 9 is a sectional view through the matrix of FIG. 8, taken along section line 9—9 therein.
Figure 10:
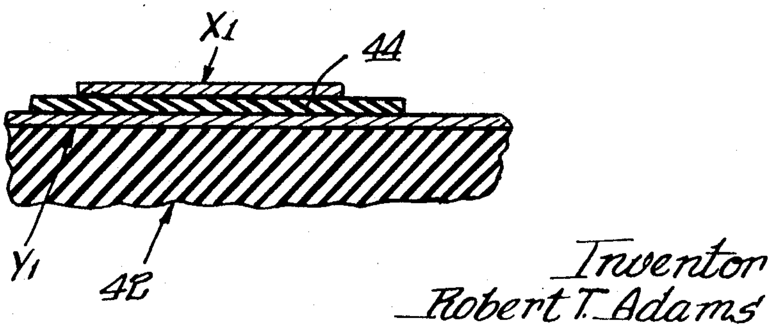
FIG. 10 is a sectional view through the matrix of FIG. 8, taken along section line 10—10 therein.

Reference should now be made to FIGS. 8—10 showing the most preferred physical form of the voltage memory matrix of the invention, developed by other than the inventor of the present invention. As there shown, the matrix unit includes an insulating base 42 of any suitable insulating material to which is applied by silkscreening or other means the spaced, parallel Y conductors. At each point along each Y conductor to be crossed by an X conductor, there is deposited a layer 44 of a suitable insulating material which extends across the full width of each Y conductor involved. The X conductors are then deposited by silkscreening on the like the same in spaced parallel bands so they pass over the insulating layers 44 to avoid electrical contact with the Y conductors at the crossover points. As shown in the illustrated embodiment of the invention, a memory switch device at each crossover point is deposited as a film in the area between the adjacent Y conductors and the associated threshold switch device is deposited as a film in the area between the adjacent X conductors. (The locations of these memory and threshold switch devices of each crossover point can obviously be reversed.) The path of current flow through a threshold or memory switch is believed to occur in a limited path or filament in the body of the semiconductor involved. To ensure consistent conducting characteristics in such a device, it is believed important to constrain the flow of current through the same path or filament each time the device carries current. To this end, as illustrated in the drawings, a layer 46 of insulating material is deposited over each conductor in the area between each adjacent pair of Y conductors. Each layer 46 of insulating material has a pore or small hole 48 therein so that only a small portion of the outer surface of each X conductor is exposed for application of a film or layer 49 of semiconductor material. Next, a film or layer of a memory switch device-forming semiconductor material is deposited over and within each pore 48 so that the semiconductor material makes contact with the X conductor over a very small area. For example, the width of each pore 48 and hence the area of contact referred to may be in the range of from 10 to 100 microns in the most preferred form of the invention. The semiconductor material of each memory switch device can be applied by sputtering, vacuum deposition or silkscreening techniques.

In a similar fashion, there is deposited a layer 46' of insulating material on each Y conductor in the area between each adjacent pair of X conductors. This layer 46' of insulating material is also provided with a pore into which is subsequently deposited or layer 49' of a threshold switch device-forming semiconductor material. The associated threshold and memory switch devices are connected in series by a suitable layer 50 of conducting material silk-screened or otherwise deposited in a band extending between the outer exposed surfaces of the semiconductor materials forming each pair of associated threshold and memory switch devices.

It is apparent that the binary memory circuit and the memory matrix array of the invention can be readily constructed by mass production, batch techniques since the various films can be easily applied by automatic deposition machinery in succession on the body 42 of the insulating material.

Also, it will be understood that the binary memory circuit of this invention may be used in other circuit arrangements which require its circuit properties, and modifications to the memory matrix array may be effected without departing from the aspects of this invention.

I claim:

1. A memory matrix including X and Y axis conductors forming rows and columns of conductors to be addressed for set, reset and readout operations, comprising in combination, first and second series connected switch devices coupled between each active crossover point of the X and Y conductors, each first switch device being a threshold switch device which has a threshold voltage value, a relatively high resistance condition and a relatively large voltage drop thereacross in the high resistance condition for voltages near the threshold voltage value applied thereto, which is switched to a relatively low resistance condition when the voltage applied thereto reaches the threshold voltage value, which has a relatively small voltage drop thereacross in the low resistance condition which is a minor fraction of the aforesaid voltage drop thereacross in the high resistance condition, and which remains in the low resistance condition until the instantaneous value of the current therethrough drops below a given holding value whereupon it switches back to the high resistance condition, each second switch device being a memory switch device which has a threshold voltage value, a relatively high resistance condition and a relatively large voltage drop thereacross in the high resistance condition for voltages near the threshold voltage value applied thereto, which is switched to a relatively low resistance condition when the voltage applied thereto reaches the threshold voltage value, which has a relatively small voltage drop thereacross in the low resistance condition which is a minor fraction of the aforesaid voltage drop thereacross in the high resistance condition, and which remains in the low resistance condition independently of the presence or absence of an applied voltage until reset to the high resistance condition by feeding a reset current pulse of a given value therethrough. the threshold voltage value of the threshold switch device being less than that of the memory switch device, set means for applying between any selected X conductor and any selected Y conductor of an active crossover point a set voltage pulse of sufficient value to drive both the serially connected threshold switch device and the memory switch device associated with the selected crossover point into their low resistance conditions and to switch the threshold switch device back to its high resistance condition upon termination of the set voltage pulse, reset means for applying between any selected X conductor and any selected Y conductor of an active crossover point a reset current pulse having sufficient voltage to drive the threshold switch device associated with the selected crossover point to its low resistance condition when the associated memory switch device is in its low resistance condition to feed a reset current pulse through the memory switch device to switch the memory switch device to its high resistance condition, and readout means for applying between any selected X conductor and any selected Y conductor a readout current pulse having sufficient voltage to drive the threshold switch device to its low resistance condition when the associated memory switch device is in its low resistance condition to feed a readout current pulse which is less than said reset current pulse through the memory switch device in its low resistance condition for readout purposes.

2. The memory matrix of claim 1 wherein said matrix includes an insulating base carrying said X and Y conductors and said threshold and memory switch devices are deposited layers or films of semiconductor material.

3. The memory matrix of claim 1 wherein said threshold and memory switch devices are bidirectional devices which conduct current in either direction and said threshold voltage levels and reset current are independent of the polarity of the applied voltage or the direction of current flow.

4. The memory matrix of claim 3 wherein the applied readout voltage for a readout operation is operable at a given magnitude independently of the polarity thereof.